United States Patent [19]

Moriya et al.

[11] Patent Number: 4,923,956

[45] Date of Patent: * May 8, 1990

[54] GRAFT POLYMERIZATION PRECURSOR AND METHOD OF MANUFACTURING THE SAME

[75] Inventors: Yasuo Moriya; Nobuyoshi Suzuki; Hiroshi Goto, all of Aichi, Japan

[73] Assignee: Nippon Oil and Fats Co., Ltd., Tokyo, Japan

[*] Notice: The portion of the term of this patent subsequent to Jun. 13, 2006 has been disclaimed.

[21] Appl. No.: 184,260

[22] Filed: Apr. 21, 1988

[30] Foreign Application Priority Data

Apr. 30, 1987 [JP] Japan ................. 62-107037

[51] Int. Cl.$^5$ ........................................... C08F 255/02
[52] U.S. Cl. .................................... 525/263; 525/277; 525/298; 525/303; 525/312
[58] Field of Search ............... 525/263, 298, 303, 312, 525/277

[56] References Cited

FOREIGN PATENT DOCUMENTS 011349  1/1985  Japan .

OTHER PUBLICATIONS

Suzuki; Chemical Abstract 107(4):23831 Preparations of Block and Graft Copolymers 7/27/87.
Chemical Abstract 103(4):23474 Laminates of Polyurethane Foams with Polyolefin Blends 1985.

*Primary Examiner*—John C. Bleutge
*Assistant Examiner*—David Buttner
*Attorney, Agent, or Firm*—Flynn, Thiel, Boutell & Tanis

[57] ABSTRACT

Resin compositions obtained by causing copolymerization of particular radical (co-and/or) polymerizable organic peroxide and vinyl monomer in particular propylene polymers and that it is a best way to use an aqueous suspension in the manufacture.

6 Claims, No Drawings

GRAFT POLYMERIZATION PRECURSOR AND METHOD OF MANUFACTURING THE SAME

BACKGROUND OF THE INVENTION

1. Field of the Invention

This invention relates to a graft polymerization precursor, which is useful as an adhesive, coating agent, quality improver, microdispersion promoter, polymer alloy precursor, functional molding material, agent for providing compatibility to polymer, etc. and permits a high grafting efficiency to be obtained.

2. Prior Art

Heretofore, it has been in the practice to mix vinyl polymers, e.g., polystyrene, with propylene polymers as a molding material, in order to improve the rigidity, dimensional stability, printing property, etc. of the propylene polymers.

Also, as a method of grafting combining a vinyl polymer with propylene polymer, there has been proposed a propylene polymer, which is obtained by graft polymerizing a vinyl monomer, e.g., styrene monomer, with propylene polymer by irradiation with ionizable radiation.

This method provides considerable effects for causing uniform dispersion of the vinyl copolymer in the propylene polymer.

As a further well-known method, there is a liquid graft polymerization method making use of such solvent as xylene or toluene. Also, there is an emulsification graft polymerization method.

Further, it has been proposed to impregnate propylene polymer particles with vinyl monomers and cause polymerization of the resultant system using an aqueous suspension (as disclosed in Japanese Patent Publication Sho 58-53003.) According to this method, in the polymerized resin composition, the vinyl polymer is uniformly mixed in the resin composition. With this method, satisfactory results can be obtained in comparison to other methods.

However, since propylene polymers and vinyl polymers are not satisfactorily compatible with each other, it is not the practice to incorporate more than 10% by weight of vinyl polymer. Usually, the vinyl polymer is incorporated only by 0.2 to 5% in an amount of from weight. Even when such a small quantity of vinyl copolymer is mixed with the propylene polymer, the impact resistance of the mixture is reduced due to the unsatisfactory mutual compatibility of the two resins, and also a deteriorated appearance is apt to occur.

However, the prior art method for causing graft coupling of vinyl polymers to propylene polymers is not fully satisfactory.

More specifically, the method of irradiation with ionizing radiation is based on a special process called the radiation graft polymerization process. This method has problems of high cost and difficulties are encountered in putting it into practice.

Further, in this method there is a limitation on the amount of vinyl monomers that can be introduced.

Further, in the solution graft polymerization process, polymerization is done in a state in which the system to be graft polymerized in diluted with a large quantity of solvent. From the standpoint of the compatibility of the propylene polymer, there is less opportunity for mutual contact of the vinyl monomer, the polymerization initiator, and the propylene polymer with one another, and generally the reaction efficiency of the vinyl monomer is low. Further, there are complicated after-treatment steps, which are economically disadvantageous. Further, in the case of the emulsion graft polymerization process the reaction is limited only to the surface reactions of propylene polymer particles.

In the process of polymerization in a water suspension, the grafting efficiency of the resin composition obtained by this process is low. Therefore, the vinyl polymer particles which have been uniformly dispersed at the end of the polymerization, are liable to undergo secondary agglomeration due to heating in the secondary processing or contact with the solvent, thus giving rise to problems when using the obtained resin composition as a functional molding material and as an agent for providing polymer compatibility.

A primary object of the invention is to increase the grafting efficiency of the prior art propylene polymers and vinyl polymers. The present invention is predicated on the findings that satisfactory resin compositions are obtained by causing copolymerization of particular radical (co-and/or) polymerizable organic peroxides and vinyl monomers in particular propylene polymers and that it is best to use an aqueous suspension polymerization process in the manufacture.

According to the invention, there is provided a graft polymerization precursor obtainable by causing copolymerization, in 100 parts by weight of propylene polymer, of from 5 to 400 parts by weight of one or more vinyl monomers selected from the group consisting of vinyl aromatic monomers, (metha-and/or) acrylic ester monomers, (metha-and/or) acrylonitrile and vinyl ester monomers and a mixture of one or more radical (co-and/or) polymerizable organic peroxides represented by the formula.

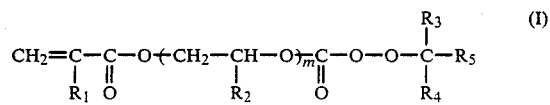

Wherein $R_1$ represents a hydrogen atom or an alkyl group of 1 or 2 carbon atoms, $R_2$ is a hydrogen atom or a methyl group, $R_3$ and $R_4$ respectively are alkyl groups of 1 to 4 carbon atoms, $R_5$ is alkyl, phenyl or alkyl-substituted phenyl group is of 1 to 12 carbon atoms or a cycloalkyl group of 3 to 12 carbon atoms, and m is 1 or 2, and the formula.

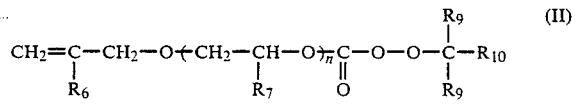

Wherein $R_6$ represents a hydrogen atom or an alkyl group of 1 to 4 carbon atoms, $R_7$ is a hydrogen atom or a methyl group, $R_8$ and $R_9$ respectively are alkyl groups of 1 to 4 carbon atoms, $R_{10}$ is an alkyl, phenyl or alkyl-substituted phenyl group of 1 to 12 carbon atoms or cycloalkyl group of 3 to 12 carbon atoms, and n being 0, 1 to 2, said radical polymerizable peroxide being incorporated in an amount of from 0.1 to 10 parts by weight, based on 100 parts by weight of said vinyl monomer or monomers, said graft polymerization precursor containing 20 to 95% by weight of propylene polymer and 80 to 5% by weight of vinyl copolymer, said vinyl copolymer containing 0.01 to 0.73% by weight of active oxygen.

According to the invention, there is also provided a method of manufacturing a graft polymerization precursor comprising the steps of suspending 100 parts by weight of propylene polymer in water, adding to the resultant suspension from 5 to 400 parts by weight of a solution obtained by dissolving, in (a) 100 parts by weight of one or more vinyl monomers selected from the group consisting of vinyl acrylic monomers, (metha- and/or) acrylic ester monomers, (metha-and/or) acrylonitrile and vinyl ester monomers, (b) from 0.1 to 10 parts by weight of one or more radical (co-and/or) polymerizable organic peroxides represented by formula I or II and (c) from 0.01 to 5 parts by weight, based on the sum of the weights of said vinyl monomer (a) and said formula (I) and (II) compounds (b) of a radical (co-and/or) polymerizable organic peroxide initiator having with a decomposition temperature of 40° to 90° C. for obtaining a half life period of 10 hours, heating the resultant mixture under a condition such that the decomposition of said radical polymerization initiator (c) does not substantially takes place whereby to impregnate said propylene polymer with said vinyl monomer(s) said radical (co-and/or) polymerizable organic peroxide(s) and said radical polymerization initiator, and, when the content of free vinyl monomer(s), radical (co-and/or) polymerizable organic peroxide(s) and said radical initiator is reduced to be 50% by weight or less of the initial value, elevating the temperature of said water suspension to cause copolymerization of said vinyl monomer(s) and radical (co-and/or) polymerizable organic peroxide(s) in said propylene polymer.

The propylene polymers employed in this invention are, for example, as follows; propylene homopolymer, and copolymers of propylene and an α-olefin or a polar ethylenically unsaturated monomer (in all cases, the content of the propylene is preferably more than 75 wt %, based on the weight of the polymer).

Concretely, for example, an isotactic polypropylene, crystalline propylene-ethylene random copolymer, crystalline propylene-ethylene block copolymer, crystalline propylene-butene-1 random copolymer and maleic anhydride modified propylene are typical.

Two or more of said propylene polymers may be employed in the mixed state.

The propylene polymer may be in the form of particles or pellets with diameters ranging from 0.1 to 5 mm. These shapes are suitably selected according to the proportion of the propylene polymer.

If the diameter is excessively large, not only is it difficult to maintain the dispersion at the time of the polymerization, but also the time required for the impregnation of vinyl monomer or the like is extended.

Specific examples of the vinyl monomer according to the invention are vinyl aromatic monomers, e.g., styrene, nucleus substituted styrenes, e.g., methyl styrene, dimethyl styrene, ethyl styrene, isopropyl styrene and chloro-substituted styrene, α-substituted styrenes, e.g., α-methyl styrene, (metha-and/or) acrylic ester monomers, e.g., alkyl esters, in which the alkyl has 1 to 7 of carbon atoms, of (metha-and/or) acrylic acid, (metha- and/or) acrylonitrile, and vinyl ester monomers, e.g., vinyl propionate and vinyl acetate.

Further, it is possible to use halogenated vinyl and vinylidene monomers (particularly, vinyl chloride and vinylidene chloride), vinyl naphthalene, vinyl carbazole, acrylamide, methacrylamide, maleic anhydride, and others. These components may be used either alone or in combintaion.

Of these compounds, vinyl aromatic monomers and (metha-and/or) acrylic ester monomers are preferred.

Particularly, hydrophilic or solid vinyl monomers are suitably dissolved in oil-soluble monomers when they are used.

The vinyl monomers are suitably incorporated in the range of 5 to 400 parts by weight, preferably 10 to 200 parts by weight, based on 100 parts by weight of propylene polymer.

If the amount is less than 5 parts by weight, sufficient performance as graft can be difficultly obtained in spite of the face that the graft after the grafting reaction has a high grafting efficiency.

When the amount exceeds 400 parts by weight, the amounts of vinyl monomer(s), radical (co-and/or) polymerizable organic peroxide(s) represented by the formulas I and II and radical polymerization initiator that is not impregnated in the propylene polymer is liable to exceed 50% by weight, thus increasing the amount of free vinyl system monomers.

According of Japanese Patent Publication Sho 58-53003, it is taught that in the water suspension polymerization process it is necessary that the free vinyl monomers be less that 20% by weight in amount.

According to the invention, however, the obtainable graft polymerization precursor has a peroxide group in its vinyl polymer molecular unit and has a grafting function. Therefore, a sufficiently excellent grafting function can be obtained even if the sum of free vinyl monomer(s) radical (co-and/or) polymerizable organic peroxide(s) represented by the formula I or II is above 20% by weight, provided that its content is less than 50% by weight. The radical (co-and/or) polymerizable organic peroxide which is used in accordance with the invention, is represented by the formula I and II. Specific examples of the compound represented by the formula I are t-butylperoxyacryloyloxyethyl carbonate, t-amylperoxyacryloyloxyethyl carbonate, t-hexylperoxyacryloyloxyethyl carbonate, 1,1,3,3-tetramethylethylbutylperoxyacryloyloxyethyl carbonate, cumylperoxyacryloyloxyethyl carbonate, p-isopropylcumylperoxyacryloyloxyethyl carbonate, t-butylperoxymethacryloyloxyethyl carbonate, t-amylperoxymethacryloyloxyethyl carbonate, t-amylperoxymechacryloyloxyethyl carbonate, t-hexylperoxymethacryloyloxyethyl carbonate, 1,1,3,3-tetramethylbutylperoxymethacryloyloxyethyl carbonate, cumylperoxymethacryloyloxyethyl carbonate, p-isopropylcumylperoxymethacryloyloxyethyl carbonate, t-butylperoxyacryloyloxyethyoxyethyl carbonate, t-amylperoxyacryloyloxyethoxyethyl carbonate, t-hexylperoxyacryloyloxyethoxyethyl carbonate, 1,1,3,3-tetramethylbutylperoxyacryloyloxyethoxyethyl carbonate, cumylperoxyacryloyloxyethoxyethyl carbonate, p-isopropylcumylperoxyacryloethoxyethyl carbonate, t-butylperoxymethacryloyloxyethoxyethyl carbonate, t-amylperoxymethacryloyloethoxyethyl carbonate, t-hexylperoxymethacryloyloxyethoxyethyl carbonate, 1,1,3,3-tetramethylbutylperoxymethacryloyloxyethoxyethyl carbonate, cumylperoxymethacryloyloxyethyoxyethyl carbonate, p-isopropylcumylperoxymethacryloyloxyethoxyethyl carbonate, t-butylperoxyacryloyloxyisopropyl carbonate, t-amylperoxyacryloyloxyisopropyl carbonate, t-hexylperoxyacryloyloxyisopropyl carbonate, 1,1,3,3-tetramethylbutylperoxyacryloyloxyisopropyl carbonate, cumylperoxyacryloyloxyisopropyl carbonate, p-isopropylcumylperoxyacryloyloxyisopropyl carbonate, t-butylperoxymethacryloyloxyisopropyl carbonate, t-amylperoxymethacryloyloxyisopropyl carbonate, t-hexylperoxymethacryloyloxyisopropyl carbonate, 1,1,3-tetramethylbutylperoxymethacryloyloxyisopropyl carbonate, cumylperoxymethacryloyloxyisopropyl carbonate, p-isopropylcumylperoxymethacryloyloxyisopropyl carbonate. Specific example of the compound represented by the formula II are t-butylperoxyallyl carbonate, t-hexylperoxyallyl carbonate, 1,1,3,3-tetramethylbutylperoxyallyl carbonate, p-menthaneperoxyallyl carbonate, t-butylperoxymethallyl carbonate, t-amylperoxymethallyl carbonate, t-hexylperoxymethallyl carbonate, 1,1,3,3-tetramethylbutylperoxymethallyl carbonate, p-menthaneperoxymethallyl carbonate, cumylperoxymethallyl carbonate, t-amylperoxyallyloxyethyl carbonate, t-hexylperoxyallyloxyethyl carbonate, t-butylperoxymethallyloxyethyl carbonate, t-amylperoxymethallyloxyethyl carbonate, t-hexylperoxymethallyloxyethyl carbonate, t-butylperoxyallyloxyisopropyl carbonate, t-amylperoxyallyloxyisopropyl carbonate, t-hexylperoxyallyloxyisopropoyl carbonate, t-butylperoxymethallyloxyisopropyl carbonate, t-amylperoxymethallyloxyisopropyl carbonate and t-hexylperoxymethallyloxyisopropyl carbonate.

Amount these compounds, t-butylperoxyacryloyloxyethyl carbonate, t-butylperoxymethacryloyloxyethyl carbonate, t-butylperoxyallyl carbonate and t-butylperoxymethallyl carbonate are preferred. The radical (co-and/or) polymerizable organic peroxide is incorporated in an amount of 0.1 to 10 parts by weight, based on 100 parts by weight of vinyl monomer(s). When the proportion is less than 0.1 parts by weight, the amount of active oxygen in the graft polymerization precursor according to the invention is insufficient, so that it is difficult to display a sufficient grafting function. When the amount exceeds 10 parts by weight, the radical (co-and/or) polymerizable organic peroxide is inductively decomposed during the polymerization, so that a large amount of gel is generated in the graft polymerization precursor at the end of grafting reaction. Further, although the grafting capacity of the graft polymerization precursor is increased, the gel formation capacity is also increased, which is undesired. With the radical polymerization initiator which is used according to the invention, the decomposition temperature for obtaining a half life period of 10 hours (hereinafter referred to as 10-hour half life temperature) is 40° to 90° C., preferably 50° to 75° C. The polymerization according to the invention, has to be done under the condition that the radical (co-and/or) polymerizable organic peroxide is not decomposed at all. Meanwhile, the 10-hour half life temperature for the radical (co-and/or) polymerizable organic peroxide is 90° to 110° C., and, therefore, the polymerization temperature should be less than 110° C. If the 10-hour half life temperature of the radical polymerization initiator exceeds 90° C., the polymerization temperature is increased, so that the polymerization temperature is increased and the radical (co-and/or) polymerizable organic peroxide is decomposed during the polymerization. If the 10-hour half life temperature is less than 40° C., polymerization is initiated during a the process of impregnating the propylene polymer with the vinyl monomer(s). By the term "10-hour half life temperature", is meant the temperature at which the polymerization initiator is decomposed by 50% when 10 hours have passed at that temperature after addition of 0.1 mol of the polymerization initiator to one liter of benzene. Specific examples of such radical polymerization initiators are di-isopropylperoxy dicarbonate (40.5° C.), di-n-propylperoxy dicarbonate (40.5° C.), dimyristylperoxy dicarbonate (40.9° C.), di-(2-ethyoxyethyl) peroxy dicarbonate (43.4° C.), di(methoxyisopropyl) peroxy dicarbonate (43.5° C.), di(2-ethylhexyl) peroxy dicarbonate (43.5° C.), t-hexylperoxyneodecanoate (44.7° C.), di(3-methyl-3-methoxybutyl) peroxy dicarbonate (46.5° C.), t-butylperoxyneodecanoate (46.50° C.), t-hexylperoxyneohexanoate (51.3° C.), t-butylperoxyneohexanoate (53° C.), 2,4-dichlorobenzoyl peroxide (53° C.), t-hexylperoxypivalate (53.2° C.) t-butylperoxypivalate (55° C.), 3,5,5-tri-methylhexanoyl peroxide (59.5° C.), octanoyl peroxide (62° C.), lauroyl peroxide (62° C.), cumylperoxy octoate (65.1° C.), acetyl peroxide (68° C.), t-butylperoxy-2-ethylhexanoate (72.5° C.), m-toluoyl peroxide (73° C.), benzoyl peroxide (74° C.), t-butylperoxy isobutyrate (78° C.), 1,1-bis (t-butylperoxy)-3,5,5-triethyl-cyclohexane (90° C.). (Figures in parentheses represent 10-hour half life temperature.)

The amount of radical polymerization initiator used is from 0.01 to 5 parts by weight, preferably 0.1 to 2.5 parts by weight, based on 100 parts by weight of the sum of vinyl monomer(s) and radical (co-and/or) polymerizable organic peroxide(s). If the amount used is less than 0.01 parts by weight, perfect polymerization of the vinyl monomer(s) and radical (co-and/or) polymerizable organic peroxide(s) can not be obtained. If the amount exceeds 5% weight, crosslinking of the propylene polymer is apt to occurs during polymerization and that induced decomposition of radical (co-and/or) polymerizable organic peroxide occurs.

According to the invention, polymerization is done by the usual aqueous suspension polymerization process. Thus, the propylene polymer and a solution prepared separately by dissolving a radical polymerization initiator and a radical (co-and/or) polymerizable organic peroxide in vinyl monomer, are stirred in water in the presence of a suspension agent used for aqueous suspension polymerization, e.g., a water-soluble polymer such as polyvinyl alcohol, polyvinyl pyrrolidone and methyl cellulose and water-insoluble inorganic compounds such as calcium phosphate and magnesium oxide.

The concentration of the aqueous suspension may be set as desired. Usually, however, the proportion of the reaction components is 5 to 150 parts by weight, based on 100 parts by weight of water.

According to the invention, the impregnation of propylene polymer with the solution noted above is suitably done at as high a temperature as possible. However, when the polymerization commences with the decomposition of the radical polymerization initiator at the time of the impregnation, the composition of the graft polymerization precursor that is formed becomes very heterogeneous. Therefore, the impregnation is usually suitably done at a temperature lower by 5° C. or more than the 10-hour half life temperature of the radical polymerization initiator used. The sum of the amounts of the free vinyl monomer, radical (co-and/or) polymerization organic peroxide and radical polymerization initiator, after the impregnation, should be less than 50% by weight, preferably less than 20% by weight, based on thier initial amount. If the sum exceeds 50% by weight, the grafting capacity of the graft polymerization precursor according to the invention is extremely reduced. The amount of free vinyl monomer, radical (co-and/or) polymerizable organic peroxide and radical polymerization initiator is calculated by sampling a given quantity of aqueous suspension, quickly filtering the sampled liquid using a metal filter of about 300 mesh to separate the liquid into a propylene polymer fraction and a liquid phase and measuring the quantities of vinyl monomer, radical (co-and/or) polymerizable organic peroxide and radical polymerization initiator in the liquid phase.

According to the invention, the polymerization is usually done at a temperature of 30° to 110° C. This is done so in order to prevent the decomposition of radical (co-and/or) polymerizable organic peroxide during the polymerization.

If the temperature exceeds 110° C., the amount of decomposition of radical (co-and/or) polymerizable organic peroxide that is decomposed is increased, which is undesired. The polymerization period is usually suitably 2 to 20 hours.

In the graft polymerization precursor according to the invention, the mixed vinyl polymer should contain 0.01 to 0.73% by weight of active oxygen.

If the content of active oxygen is less than 0.01% by weight, the grafting capacity of the graft polymerization precursor is extremely reduced.

If the content exceeds 0.73% by weight, molecular decomposition of the graft polymerization precursor will occur and the gel formation capacity is increased, which is also undesired.

The active oxygen content can be calculated by extracting the vinyl polymer from the graft polymerization precursor according to the invention by solvent extraction and obtaining the active oxygen content of the vinyl polymer by the iodometric method.

The graft polymerization precursor according to the invention can be grafted by merely heating it. For example, a resin composition having a high grafting efficiency can be obtained by causing melt mixing using an extruder, a mixer or the like.

The graft polymerization precursor permits a resin composition having a high grafting efficiency to be obtained by mere heating.

It is thus thought that in the resin composition obtained by the heating process, the aggregation of vinyl monomer due to the secondary processing is reduced compared to the composition obtained by the prior art aqueous suspension polymer, and it is expected that a high effect is obtainable as a compatibilizer between polymers.

Further, the method of manufacturing a graft polymerization precursor according to the invention is an aqueous suspension polymerization process. Therefore, it is possible to readily manufacture a large amount of graft polymerization precursor without need of any particular apparatus.

Further, it is possible to introduce a large quantity of vinyl polymer compared to the prior art method of manufacture.

EXAMPLES AND COMPARATIVE EXAMPLES

Now, the invention will be described in further detail in conjunction with examples.

EXAMPLE 1

2,500 g of pure water was charged into a stainless steel autoclave with a volume of 5 l and 2.5 g of polyvinyl alcohol was dissolved as a suspension agent.

Further, 700 g of propylene polymer (available under the trade name "Sumitomonoburen", from Sumitomo Chemical Co., Ltd., pellet-like) was charged and dispersed by agitation. Separately, 1.5 g of benzoyl peroxide (available under the trade name "Nyper-B" by Nippon Oil and Fats Co., Ltd., with 10-hour half life temperature of 74° C.) as radical polymerization initiator and 6 g of t-butylperoxymethacryloyloxyethyl carbonate as radical (co-and/or) polymerizable organic peroxide were dissolved in 300 g of vinyl monomer, and the resultant solution was charged into the autoclave, and the resultant solution was agitated.

Then, the autoclave was heated to elevate its temperature to 60° to 65° C., and the system was agitated for two hours, whereby the propylene polymer was impregnated with the vinyl monomer containing the radical polymerization initiator and radical (co-and/or) polymerizable organic peroxide. Subsequently, after confirming that the content of free vinyl monomer, radical (co-and/or) polymerizable organic peroxide and radical polymerization initiator was less than 50% by weight of the initial amount, the temperature was elevated to 80° to 85° C., and the system was held at this temperature for 7 hours to complete polymerization, followed by washing with water and drying to obtain a graft polymerization precursor.

This graft polymerization precursor was made into a film using a press, and the styrene copolymer content 28.5% by weight was calculated from polystyrene characteristics absorption of an infrared absorption specturm of 1,603 cm$^{-1}$.

Further, extraction from this graft polymerization precursor was done at room temperature for 7 days using ethyl acetate to obtain a styrene solution, which was charged into methanol to obtain white powdery styrene polymer.

The active oxygen content in this styrene polymer was measured by the iodometry method, and it was 0.13% by weight. This graft polymerization preformed was subjected to extraction in a Soxhlet extractor with xylene. No insoluble part in xylene remaining was found.

REFERENCE EXAMPLE 1

The graft polymerization precursor obtained in Example 1 was kneaded at 180° C. for 10 minutes using a laboratory plastmill "B-75 Type Mixer" for grafting reaction.

After the grafting reaction, the resultant system was subjected to extraction in a Soxhlet extractor with ethyl acetate to extract non-grafted styrene polymer.

The extracted non-grafted styrene polymer was 9.8% by weight with respect to the total amount.

Thus, the grafting efficiency of the styrene polymer was calculated to be 67.3% by weight.

Further, in the extraction with xylene, the insoluble part in xylene was 10.3% by weight.

COMPARATIVE EXAMPLE 1

A graft polymerization precursor was prepared in the same manner as Example 1 except that t-butylperoxymethacryloyroxyethyl carbonate was used.

With this graft polymerization precursor, the contents of styrene polymer, active oxygen and insoluble part in xylene were measured in the same manner as in Example 1. They were respectively 28.3, 0 and 0% by weight.

The grafting efficiency of this graft polymerization precursor was obtained by causing grafting reaction in the manner as in Reference Example 1.

It was 0% by weight, that is, this graft polymerization preformer had entirely no grafting capacity.

COMPARATIVE EXAMPLE 2

A graft polymerization precursor was prepared in the same manner as in Example 1 except for that dicumylperoxide was used in lieu of t-butylperoxymethacryloyloxyethyl carbonate.

In this case, the contents of styrene polymer, active oxygen and insoluble part in xylene were respectively 28.3, 0202 and 0% by weight.

The active oxygen content of 0.02% by weight is thought to be due to the fact that dicumylperoxide extracted with ethyl acetate was dissolved in methanol/ethyl acetate solvent as reprecipitation solvent and distributed into propylene polymer during the polymerization.

This graft polymerization precursor was analyzed in the same manner as in Reference Example 1 to find that the grafting efficiency with respect to propylene polymer and styrene polymer is 0.9% by weight. It was thought that because dicumylperoxide was used, substantially no grafting occurred.

Further, the insoluble part content in xylene was 0.7% by weight.

EXAMPLE 2

A graft polymerization precursor was prepared in the same manner as in Example 1 except for that 300 g of methyl methacrylate was used in lieu of 300 g of styrene.

This graft polymerization precursor was analyzed in the same manner as in Example 1 to find a methyl methacrylate polymer content of 25.7% by weight (the determination based on infrared absorption spectrum being done by 1,720 to 1,730 $cm^{-1}$), an active oxygen content of 0.12% by weight and an insoluble part in xylene content of 0% by weight.

REFERENCE EXAMPLE 2

The graft polymerization precursor obtained in Example 2 was grafted in the same manner as in Reference Example 1.

The grafting efficiency was 51.5% by weight.

COMPARATIVE EXAMPLE 3

2,500 g of pure water was charged into a stainless steel autoclave with a volume of 5 l, and 2.5 g of polyvinyl alcohol was dissolved as a suspension agent. To the resultant system was added a mixture consisting of 1,000 g of styrene, 5 g of benzoyl peroxide and 20 g of t-butylperoxymethacryloyloxyethyl carbonate.

The admixture was subjected to polymerization at 80° to 85° C. for 7 hours to obtain a peroxide-group-containing styrene polymer composition.

5 g of the peroxide-group-containing styrene polymer composition was dissolved in benzene.

The resultant solution was then charged into methanol to remove the non-copolymerized peroxide, thus obtaining peroxide-group-containing styrene polymer. As a result, substantially the same styrene polymer as in the case of Example 1 with an active oxygen of 0.13% by weight was obtained.

Then, 70 parts by weight of propylene polymer used in Example 1 and 30% by weight of peroxy-group-containing styrene polymer were mixed together for grafting reaction in the manner as in reference Example 1. The grafting efficiency was 0% by weight.

The insoluble part content in xylene was 7.2% by weight.

The insoluble part in xylene content was only the inter-molecular bridging of the styrene copolymer occurred.

In other words, in this case no grafting reaction occurred, but only inter molecular crosslinking reaction of styrene polymer occurred.

EXAMPLE 3

A graft polymerization precursor was prepared in the same manner as in Example 1 except for 300 g of vinyl acetate was used in lieu of 300 g of styrene and 6 g of t-butylperoxyallyl carbonate in lieu of 6 g of t-butylperoxymethacryloyloxyethyl carbonate.

This graft polymerization precursor is made into a film using a press, and the polyvinyl acetate content was determined from carbonyl absorption of 1,720 to 1,730 $cm^{-1}$ of infrared absorption spectrum. It was 28% by weight.

Thus the graft polymerization precursor was subjected to extraction at room temperature for 7 days with methanol to extract polyvinyl acetate. The system was further charged into petroleum ether to obtain polyvinyl acetate powder. The active oxygen of the polyvinyl acetate was 0.16% by weight. The insoluble part content in xylene in the graft polymerization precursor was 1.7% by weight.

REFERENCE EXAMPLE 3

Grafting reaction was caused in the same manner as in Reference Example 1 except that what was obtained in Example 3 was used in lieu of the graft polymerization precursor and that methanol was used in lieu of ethyl acetate as an extraction solvent for calculating the grafting efficiency. As a result, the grafting efficiency was 56.7% by weight.

EXAMPLE 4

A graft polymerization precursor was obtained in the same manner as in Example 1 except for that 255 g of styrene and 75 g of acrylonitrile were used as vinyl monomer. The composition of the graft polymerization precursor contained 27.8% by weight of vinyl copolymer as determined from the yield at the time of the completion of polymerization (the yield being of what is in the form of pearls, excluding what is in the powdery form, which consists of vinyl copolymers). The content of active oxygen in the vinyl copolymer as measured in the manner as in Example 1 was 0.14% by weight. The Insoluble part in xylene content was 0.8% by weight.

REFERENCE EXAMPLE 4

Grafting reaction was caused in the same manner as in Reference Example 1 except that what was obtained in Example 4 was used as graft polymerization precursor. The grafting efficiency was 61.2% by weight.

EXAMPLE 5

A graft polymerization precursor was obtained in the same manner as described in Example 1 except that lauroyl peroxide (available under a trade name "Perroyl L" manufactured by Nippon Oil & Fats Co., Ltd. with a 10-hour half life temperature of 62° C. was used in lieu of benzoyl peroxide as the radical polymerization initiator and that the polymerization temperature and time were correspondingly set at 70° to 75° and 9 hours, respectively.

This graft polymerization precursor had a composition containing 27.9% by weight of styrene polymer, 0.12% by weight of active oxygen contained in the styrene polymer and 0% by weight of insoluble part in xylene.

COMPARATIVE EXAMPLE 4

A graft polymerization precursor was obtained in the manner as described in Example 1 except for that t-butyl-peroxybenzoate (available under a trade name "Perbutyl Z" manufactured by Nippon Oil and Fats Co., Ltd. with a 10-hour half life temperature of 104° C.) was used in lieu of benzoyl peroxide as the radical polymerization initiator and that the polymerization temperature and time were correspondingly set to be 120° C. and 6 hours, respectively.

This graft polymerization precursor contained 97% by weight of insoluble part in xylene. This is thought to be due to presumed decomposition of t-butylperoxymethacryloyloxyethyl carbonate, giving rise to intermolecular crosslinking.

EXAMPLES 6 TO 9

Graft polymerization precursors were prepared using propylene polymer, styrene, benzoyl peroxide, t-butylperoxymethacryloyloxyethyl carbonate in quantities as listed in Table 1.

These graft polymerization precursors were subjected to grafting reaction in the same manner as in Reference Example 1, and the grafting efficiency and insoluble part in xylene content of the resultant grafted system were measured. The results are shown in Table 1.

COMPARATIVE EXAMPLES 5 TO 8

Graft polymerization precursors were manufactured by using propylene polymer, styrene, benzoyl peroxide and t-butylperoxymethacryloyloxyethyl carbonate as in Example 1 in quantities as shown in Table 2.

Further, these graft polymerization precursors were subjected grafting reaction in the same manner as in Reference Example 1, and the grafting efficiency and insoluble part content in xylene of the resultant grafted system were measured.

The results are shown in Table 2.

COMPARATIVE EXAMPLE 9

A graft polymerization precursor was prepared in the manner as shown in Example 1 except that cumylperoxyneodecanoate (available under a trade name "Percumyl ND" manufactured by Nippon Oil & Fats Co., Ltd. with a 10-hour half life temperature of 36.6° C. was used in lieu of benzoyl peroxide as the radical polymer initiator and that the impregnation temperature and time were set to 35° C. and 2 hours, respectively, and the polymerization temperature to 60° C.

This graft polymerization precursor was covered by a transparent resin, and what was in the powdery form, consisting of the sole styrene polymer, reached in amount to 63% by weight of the charged amount of styrene.

This graft polymerization precursor was subjected to grafting reaction in the same manner as in Reference Example 1.

The grafting efficiency was 5% by weight.

TABLE 1

| | EXAMPLE | 6 | 7 | 8 | 9 |
|---|---|---|---|---|---|
| Mixing ratio of graft polymerization preformer (part by weight) | Propylene Polymer | 70 | 70 | 70 | 25 |
| | Styrene | 30 | 30 | 30 | 75 |
| | Benzoyl Peroxide | 0.15 | 0.15 | 0.9 | 0.38 |
| | t-Butylperoxymethacryloyloxyethyl Carbonate | 0.15 | 1.5 | 0.15 | 1.5 |
| Analysis data for Graft polymerization (% by weight) | Styrene system Polymer Content | 28 | 28 | 28 | 60 |
| | Insoluble part in Xylene | 0 | 0.1 | 0 | 0 |
| | Active oxygen content Styrenic polymer | 0.03 | 0.3 | 0.03 | 0.12 |
| Analysis data for grafted polymer (% by weight) | Grafting efficiency | 40 | 65 | 42 | 31 |
| | Insoluble part in Xylene | 4 | 12 | 1.3 | 9 |

TABLE 2

| | Comparative Example | 6 | 7 | 8 | 9 |
|---|---|---|---|---|---|
| Mixing ratio of graft polymerization preformer (part by weight) | Propylene Polymer | 70 | 70 | 70 | 10 |
| | Styrene | 30 | 30 | 30 | 90 |
| | Benzoyl Peroxide | 0.15 | 0.15 | 2.4 | 0.45 |
| | t-Butylperoxymethacryloyloxyethyl Carbonate | 0.02 | 4.5 | 0.15 | 1.8 |
| Analysis data for Graft polymerization (% by weight) | Styrene system Polymer Content | 28 | 28 | 27 | 65 |
| | Insoluble part in Xylene | 0 | 53 | 50 | 0.5 |
| | Active oxygen content Styrenic polymer | 0.005 | 0.93 | 0.03 | 0.03 |
| Analysis data for grafted polymer (% by weight) | Grafting efficiency | 1 | — | — | 55 |
| | Insoluble part in Xylene | 0 | — | — | 6 |

—: Incapable of measurement

What is claimed is:

1. A graft polymerization precursor obtained by mixing (a) 100 parts by weight of a propylene polymer with (b) from 5 to 400 parts by weight of a solution of at least one radical polymerizable organic peroxide dissolved in a vinyl monomer component, said vinyl monomer component being one or more vinyl monomers selected from the group consisting of vinyl aromatic monomers, acrylic ester monomers, methacrylic ester monomers, acrylonitrile, methacrylonitrile and vinyl ester monomers, said organic peroxide being selected from the group consisting of compounds having the formula

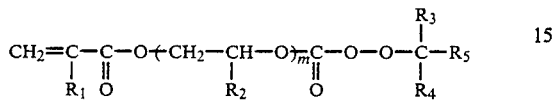

wherein $R_1$ is hydrogen or alkyl having 1 or 2 carbon atoms, $R_2$ is hydrogen or methyl, $R_3$ and $R_4$, which can be the same or different, are alkyl having 1 to 4 carbon atoms, $R_5$ is alkyl having 1 to 12 carbon atoms, phenyl, alkylphenyl having 1 to 12 carbon atoms or cycloalkyl having 3 to 12 carbon atoms, and m is 1 or 2, and compounds having the formula

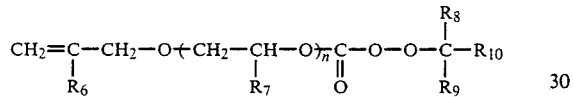

wherein $R_6$ is hydrogen or alkyl having 1 to 4 carbon atoms, $R_7$ is hydrogen or methyl, $R_8$ and $R_9$, which can be the same or different, are alkyl having 1 to 4 carbon atoms, $R_{10}$ is alkyl having 1 to 12 carbon atoms, phenyl, alkylphenyl having 1 to 12 carbon atoms or cycloalkyl having 3 to 12 carbon atoms, and n is 0, 1 or 2, said solution containing from 0.1 to 10 parts by weight of said organic peroxide per 100 parts by weight of said vinyl monomer component, and copolymerizing said vinyl monomer component and said peroxide to form a graft polymerization precursor, said graft polymerization precursor containing from 20 to 95% by weight of said propylene polymer and, correspondingly, from 80 to 5% by weight of a vinyl copolymer of said vinyl monomer component and said polymerizable organic peroxide, said vinyl copolymer containing from 0.01 to 0.73% by weight of active oxygen.

2. The graft polymerization precursor according to claim 1, wherein at least 50% by weight of said vinyl monomer component consists of vinyl aromatic monomers.

3. The graft polymerization precursor according to claim 1, wherein at least 50% by weight of said vinyl monomer component consists of methacrylic ester monomers, acrylic ester monomers or mixtures thereof.

4. A method of preparing a graft polymerization precursor comprising the steps of suspending 100 parts by weight of a propylene polymer in water, adding to the resulting suspension from 5 to 400 parts by weight of a solution obtained by dissolving at least one radical polymerizable organic peroxide and a radical polymerizable initiator in a vinyl monomer component, said vinyl monomer component being one or more vinyl monomers selected from the group consisting of vinyl aromatic monomers, acrylic ester monomers, methacrylic ester monomers, acrylonitrile, methacrylonitrile and vinyl ester monomers, said organic peroxide being selected from the group consisting of compounds having the formula

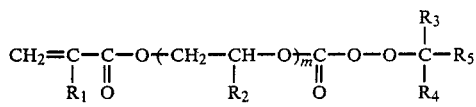

wherein $R_1$ is hydrogen or alkyl having 1 or 2 carbon atoms, $R_2$ is hydrogen or methyl, $R_3$ and $R_4$, which can be the same or different, are alkyl having 1 to 4 carbon atoms, $R_5$ is alkyl having 1 to 12 carbon atoms, phenyl, alkylphenyl having 1 to 12 carbon atoms or cycloalkyl having 3 to 12 carbon atoms, and m is 1 or 2, and compounds having the formula

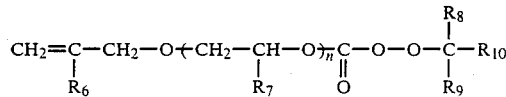

wherein $R_6$ is hydrogen or alkyl having 1 to 4 carbon atoms, $R_7$ is hydrogen or methyl, $R_8$ and $R_9$, which can be the same or different, are alkyl having 1 to 4 carbon atoms, $R_{10}$ is alkyl having 1 to 12 carbon atoms, phenyl, alkylphenyl having 1 to 12 carbon atoms or cycloalkyl having 3 to 12 carbon atoms, and n is 0, 1 or 2, said radical polymerizable initiator being a peroxide having a decomposition temperature of from 40° to 90° C. for a half-life period of 10 hours)

said solution containing from 0.1 to 10 parts by weight of said organic peroxide per 100 parts by weight of said vinyl monomer, and from 0.01 to 5 parts by weight of said initiator per 100 parts by weight of the sum of said vinyl monomer component and said polymerizable organic peroxide, heating said aqueous suspension under conditions incapable of inducing substantial decomposition of said initiator until said propylene polymer is impregnated with at least 50% by weight of said vinyl monomer component, said organic peroxide and said initiator, and then elevating the temperature of said aqueous suspension to begin decompositioon of said initiator to induce copolymerization of said vinyl monomer component and said organic peroxide and thereby form graft polymerization precursor.

5. The method of manufacturing a graft polymerization precursor according to claim 4, wherein at least 50% by weight of said vinyl monomer component consists of vinyl aromatic monomers.

6. The method of graft polymerization precursor according to claim 4, wherein at least 50% by weight of said vinyl monomer component consists of acrylic ester monomer, methacrylic ester monomer or mixture thereof.

* * * * *